(12) United States Patent
Odinaev

(10) Patent No.: US 11,877,052 B2
(45) Date of Patent: Jan. 16, 2024

(54) FILMING AN EVENT BY AN AUTONOMOUS ROBOTIC SYSTEM

(71) Applicant: Cortica Ltd., Tel Aviv (IL)

(72) Inventor: Karina Odinaev, Tel Aviv (IL)

(73) Assignee: Cortica Ltd., Tel Aviv (IL)

( * ) Notice: Subject to any disclaimer, the term of this patent is extended or adjusted under 35 U.S.C. 154(b) by 0 days.

(21) Appl. No.: 17/643,159

(22) Filed: Dec. 7, 2021

(65) Prior Publication Data
US 2022/0182535 A1    Jun. 9, 2022

Related U.S. Application Data

(60) Provisional application No. 63/122,926, filed on Dec. 8, 2020.

(51) Int. Cl.
| | |
|---|---|
| *H04N 23/60* | (2023.01) |
| *G06V 10/74* | (2022.01) |
| *H04N 23/61* | (2023.01) |
| *B64U 101/30* | (2023.01) |
| *G06V 20/00* | (2022.01) |
| *B64C 39/02* | (2023.01) |

(52) U.S. Cl.
CPC .......... *H04N 23/64* (2023.01); *B64C 39/024* (2013.01); *G06V 10/74* (2022.01); *G06V 20/35* (2022.01); *H04N 23/61* (2023.01); *B64U 2101/30* (2023.01)

(58) Field of Classification Search
CPC .......... H04N 5/23222; H04N 5/23218; H04N 23/64; H04N 23/61; H04N 23/60; G06V 20/35; G06V 10/74; B64C 2201/127; B64U 2101/30
See application file for complete search history.

(56) References Cited

U.S. PATENT DOCUMENTS

| | | | |
|---|---|---|---|
| 8,659,667 B2* | 2/2014 | Syed ................... | H04N 23/633 |
| | | | 348/207.1 |
| 10,074,003 B2* | 9/2018 | Xu ......................... | H04N 23/64 |

(Continued)

FOREIGN PATENT DOCUMENTS

CN          111866468 A   * 10/2020    ............. G06N 20/00

OTHER PUBLICATIONS

J. Chen and P. Carr, "Mimicking Human Camera Operators," 2015 IEEE Winter Conference on Applications of Computer Vision, 2015, pp. 215-222, doi: 10.1109/WACV.2015.36. (Year: 2015).*

(Continued)

*Primary Examiner* — Michael Robert Cammarata
(74) *Attorney, Agent, or Firm* — Reches Patents

(57) ABSTRACT

A method for filming an event by an autonomous drone, the method may include acquiring, by the autonomous drone, a current set of images of the event; generating signatures of the current set of images to provide current signatures; searching for one or more relevant concept structures out of a group of concept structures; wherein each relevant concept structure comprises at least one signature that matches at least one of first signatures; wherein each concept structure is associated with filming parameters; and determining, at least in part, based on the filming parameters associated with at least one of the one or more relevant concept structures, next filming parameters to be applied during an acquisition of one or more next sets of images.

19 Claims, 4 Drawing Sheets

(56) References Cited

U.S. PATENT DOCUMENTS

| | | | | |
|---|---|---|---|---|
| 10,574,881 | B2* | 2/2020 | Oleson | H04N 23/611 |
| 2010/0329552 | A1* | 12/2010 | Yim | H04N 1/00456 |
| | | | | 382/165 |
| 2014/0247342 | A1* | 9/2014 | Ellenby | H04N 5/23222 |
| | | | | 715/709 |
| 2016/0012270 | A1* | 1/2016 | Xu | G06V 40/10 |
| | | | | 382/115 |
| 2016/0127641 | A1* | 5/2016 | Gove | H04N 5/23218 |
| | | | | 348/143 |
| 2016/0142625 | A1* | 5/2016 | Weksler | H04N 5/23206 |
| | | | | 348/222.1 |
| 2016/0284095 | A1* | 9/2016 | Chalom | G06V 10/26 |
| 2017/0180623 | A1* | 6/2017 | Lin | G11B 27/031 |
| 2017/0336858 | A1* | 11/2017 | Lee | H04N 23/64 |
| 2018/0060690 | A1* | 3/2018 | Lee | H04N 5/265 |
| 2018/0157666 | A1* | 6/2018 | Raichelgauz | H04H 60/66 |
| 2019/0213324 | A1* | 7/2019 | Thorn | G06F 21/554 |
| 2019/0246042 | A1* | 8/2019 | Liu | G06V 20/13 |
| 2019/0253614 | A1* | 8/2019 | Oleson | H04N 5/23222 |
| 2019/0340197 | A1* | 11/2019 | Sugaya | G06V 10/774 |
| 2019/0392831 | A1* | 12/2019 | Pohl | H04N 5/23212 |
| 2020/0092465 | A1* | 3/2020 | Lee | G06N 3/08 |
| 2020/0120267 | A1* | 4/2020 | Stelmar Netto | G06V 10/993 |
| 2020/0304707 | A1* | 9/2020 | Williams | G06T 7/0004 |
| 2021/0009270 | A1* | 1/2021 | Chen | B64D 47/08 |
| 2021/0368094 | A1* | 11/2021 | Li | G06N 20/00 |
| 2021/0409593 | A1* | 12/2021 | Zacharias | H04N 5/23222 |
| 2022/0038620 | A1* | 2/2022 | Demers | G06V 10/40 |
| 2022/0058393 | A1* | 2/2022 | Calvert | G06V 20/41 |
| 2022/0191389 | A1* | 6/2022 | Lei | H04N 5/23218 |
| 2022/0234501 | A1* | 7/2022 | Odinaev | B60Q 9/00 |
| 2022/0286603 | A1* | 9/2022 | Lv | H04N 5/232121 |
| 2022/0327886 | A1* | 10/2022 | Mathur | G07F 17/322 |
| 2022/0345621 | A1* | 10/2022 | Shi | G06T 7/74 |

OTHER PUBLICATIONS

Galvane, Quentin, et al. "Automated cinematography with unmanned aerial vehicles." arXiv preprint arXiv:1712.04353 (2017). (Year: 2017).*

M. Gschwindt, , "Can a Robot Become a Movie Director? Learning Artistic Principles for Aerial Cinematography," 2019 IEEE/RSJ International Conference on Intelligent Robots and Systems (IROS), 2019, pp. 1107-1114, doi: 10.1109/IROS40897.2019.896759 (Year: 2019).*

C. Huang et al., "ACT: An Autonomous Drone Cinematography System for Action Scenes," 2018 IEEE International Conference on Robotics and Automation (ICRA), 2018, pp. 7039-7046, doi: 10.1109/ICRA.2018.8460703. (Year: 2018).*

Joubert, Niels, et al. "Towards a drone cinematographer: Guiding quadrotor cameras using visual composition principles." arXiv preprint arXiv:1610.01691 (2016). (Year: 2916).*

Huang, Chong, et al. "One-shot imitation filming of human motion videos." arXiv preprint arXiv: 1912.10609 (2019). (Year: 2019).*

* cited by examiner

FILMING AN EVENT BY AN AUTONOMOUS ROBOTIC SYSTEM

BACKGROUND

During the last couple of years drones have been used for aerial photography. Ariel photography may involve acquiring videos of events.

In order to acquire a video of an event by a drone—the drone is manually controlled by a human photographer. The manual control may include continuously setting, by the human photographer, the filming parameters of the drone—especially determine an angle of view, a distance from the event, persons of interest and/or event parts of interest.

The manual setting of the filming parameters is error prone and is costly.

There is a need to provide a more efficient and cost effective manner to acquire videos of an event using a drone.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
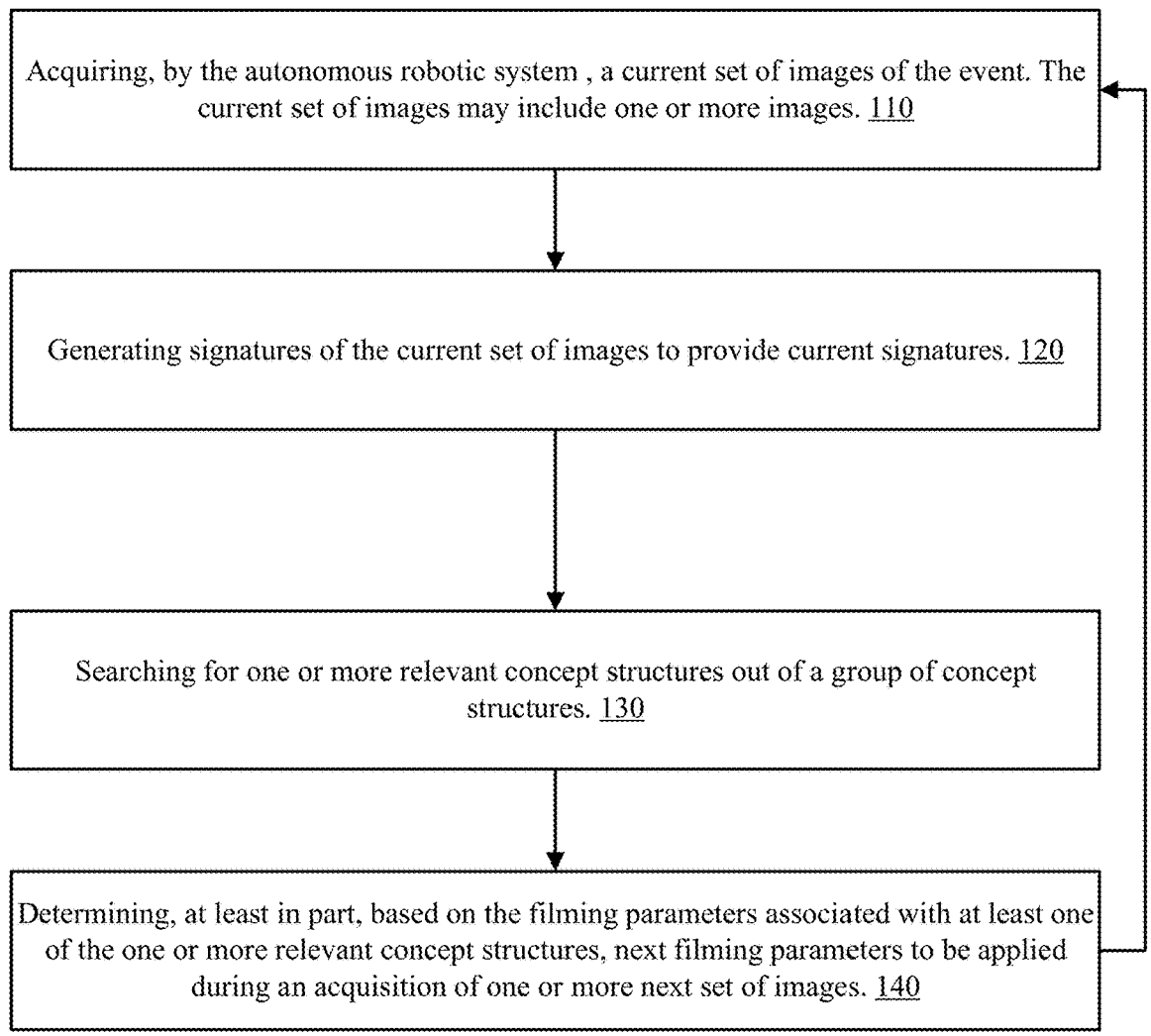
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or computerized system capable of executing the method and/or to a non-transitory computer readable medium that stores instructions for executing the method.

Any reference in the specification to a computerized system or device should be applied mutatis mutandis to a method that may be executed by the computerized system, and/or may be applied mutatis mutandis to non-transitory computer readable medium that stores instructions executable by the computerized system.

Any reference in the specification to a non-transitory computer readable medium should be applied mutatis mutandis to a device or computerized system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of computerized systems, units, components, processors, sensors, illustrated in the specification and/or drawings may be provided.

Any reference to any of the term "comprising" may be applied mutatis mutandis to the terms "consisting" and "consisting essentially of".

Any reference to any of the term "consisting" may be applied mutatis mutandis to the terms "comprising" and "consisting essentially of".

Any reference to any of the term "consisting essentially of" may be applied mutatis mutandis to the terms "comprising" and "comprising".

The term "event" is a thing that happens. An event may be a formal event, a structured event, a non-formal event, an unstructured event, may include virtually anything that happens—for example—weddings, a sport event, a family event, one or more persons doing something, an attempt to sell a product, and the like. For simplicity of explanation various examples will refer to a wedding. Any reference to a wedding may be applied mutatis mutandis to any other event.

The method may be executed by any robotic system—airborne robotic system, land driven robotic system, amphibious robotic system, and the like. For simplicity of explanation various examples will refer to a drone. Any reference to a drone may be applied mutatis mutandis to any other robotic system.

Filming parameters may include any parameter related to an acquisition of multimedia units of an event. For example—a distance between a camera conveyed by a drone and an angle of filming, one or more objects of interest and the like. The distance may be the physical distance of a function of the physical distances and a magnification applied by the camera.

There is provided a solution is applicable to virtually any type of event.

Most events, such as weddings, are relatively structured. For example—a typical wedding may include the following stages—processional, opening remarks, exchange of vows, exchange of rings, declaration of marriage, first kiss, closing remarks and recessional that may include a first dance, slicing a cake, a dancing party, and the like. A typical wedding may also include typical persons of interest—such as (in a heterosexual wedding) the bride, the groom, the best man, the bridesmaid, the bride's parents, the groom's parents, and the like.

The different stages of the weddings may be characterized by applying different filming parameters—for example—during the exchange of vows it is customary to acquire videos of the bride and groom from a relatively small distance and from a position that faces the couple and at an angle that is nearly horizontal. Yet for another example—the dancing party may be captured from a greater distance and from steeper angles of view.

The different filming parameters are also responsive to the persons of interest—as it is expected to obtain more footage of the groom and the bride than of some of the guests of the wedding.

A machine learning process may be trained to detect a type of event, stages of the event persons of interest—and may automatically determine the filming parameters to be applied during different points of time during the event.

The training may include feeding the machine learning process with datasets that include videos of events. The training can be unsupervised and generate by itself various categories based on a large untagged set of videos.

A datasets may include videos acquired by a drone, may include videos not acquired by a drone, and the like.

The filming parameters related to different points of time during the events may be explicitly provided to the machine learning process or may be learnt by the machine learning process.

The datasets may include videos that may be tagged or untagged. The tagging may be of any resolution. For example a video of a wedding may be tagged with the bride, the groom, other persons of interest, stages of the wedding, and the like. Another video may be tagged with only some of the persons of interest. One or more stages of the event may not be tagged at all.

The machine learning process may determine, during the training, which filming parameters are applied during different points of time and/or in relation to persons of interest of the event.

The machine learning process may generate statistics or any other metadata related to the filming parameters—for example the most common range and/or angle of view of camera during an exchange of vows, or any other stage of an event. Yet for another example—the percentage of footage allocated to persons of interest, and the like.

The machine learning process may detect a type of the event based on one or more object that may be unique to the event—for example a bride's dress, a wedding cake. If there is no unique identifiers of a specific event—the method may try to identify a more general, higher level concept, and clarify it at a later stage when such identifier appears (e.g. the method can identify a party in general due to people, balloons, refreshments), and film based on this assumption, and later on where a unique identifier is detected—birthday cake with candles, presents etc appear—it can narrow down the type of event. Thus—the search for identifying elements may be executed at least until a narrower unique identifier is found—until finding a narrower (related to a specific type of event out of multiple types of events that may share a more general identifier) concept structure.

The machine learning process may detect a type of the event based on objects (including people and still objects) that typically appear in that event.

FIG. 1 illustrates method 100 for filming an event by an autonomous robotic system such as an autonomous robotic system.

Method 100 may include step 110 of acquiring, by the autonomous robotic system, a current set of images of the event. The current set of images may include one or more images. The set of images may cover a period of time that may be less than a second, a few seconds, 10, 20, 30, 40 seconds, a minute, a few minutes and more.

Step 110 may be followed by step 120 of generating signatures of the current set of images to provide current signatures. These signatures are denoted 80(1)-80(L) in FIG. 3.

Step 120 may be followed by step 130 of searching for one or more relevant concept structures out of a group of concept structures. The relevant concept structures are denoted 85(1)-85(P) in FIG. 3 and are associated with up to P filming parameters 87(1)-87(P).

Each concept structure include signatures and metadata. For example—referring to FIG. 3—cluster 81(1) includes S signatures 81(1,1)-81(1,S) and S' metadata items 81'(1,1)-81'(1,S'). Cluster 83(K) includes T signatures 83(1,1)-83(1,T) and T' metadata items 83'(1,1)-83'(1,T').

The group of concept structures are built by a machine learning process that was applied on multiple videos. The multiple videos may include videos obtained by a person related to the event.

Each relevant concept structure includes at least one signature that matches at least one of first signatures.

Each concept structure may include signatures and metadata.

The concept structures may be associated with objects of interest (including persons of interest, items of objects, animals of interest), may be associated with situations or stages of an event (reception, dancing, and the like)—or may be associated with a combination of objects of interest and stages of an event. See FIG. 3—illustrates reference concept structures 81(1)-81(N) associated with N different objects of interest, reference concept structures 82(1)-82(M) associated with M different situations or stages of an event (reception, dancing, and the like), and reference concept structures 83(1)-83(K) associated with K combination thereof.

Non-limiting examples of signature generation and searching for similar (for example matching) concept structure signatures is illustrated in U.S. patent application Ser. No. 16/542,327 filing date Aug. 16, 2019 which is incorporated herein by reference.

Each concept structure is associated with filming parameters. A concept structure may include metadata regarding filming parameters. Alternatively—the method may deduct the filming parameters in any other manner.

Step 130 may be followed by step 140 of determining, at least in part, based on the filming parameters associated with at least one of the one or more relevant concept structures, next filming parameters to be applied during an acquisition of one or more next set of images.

Figure 3:
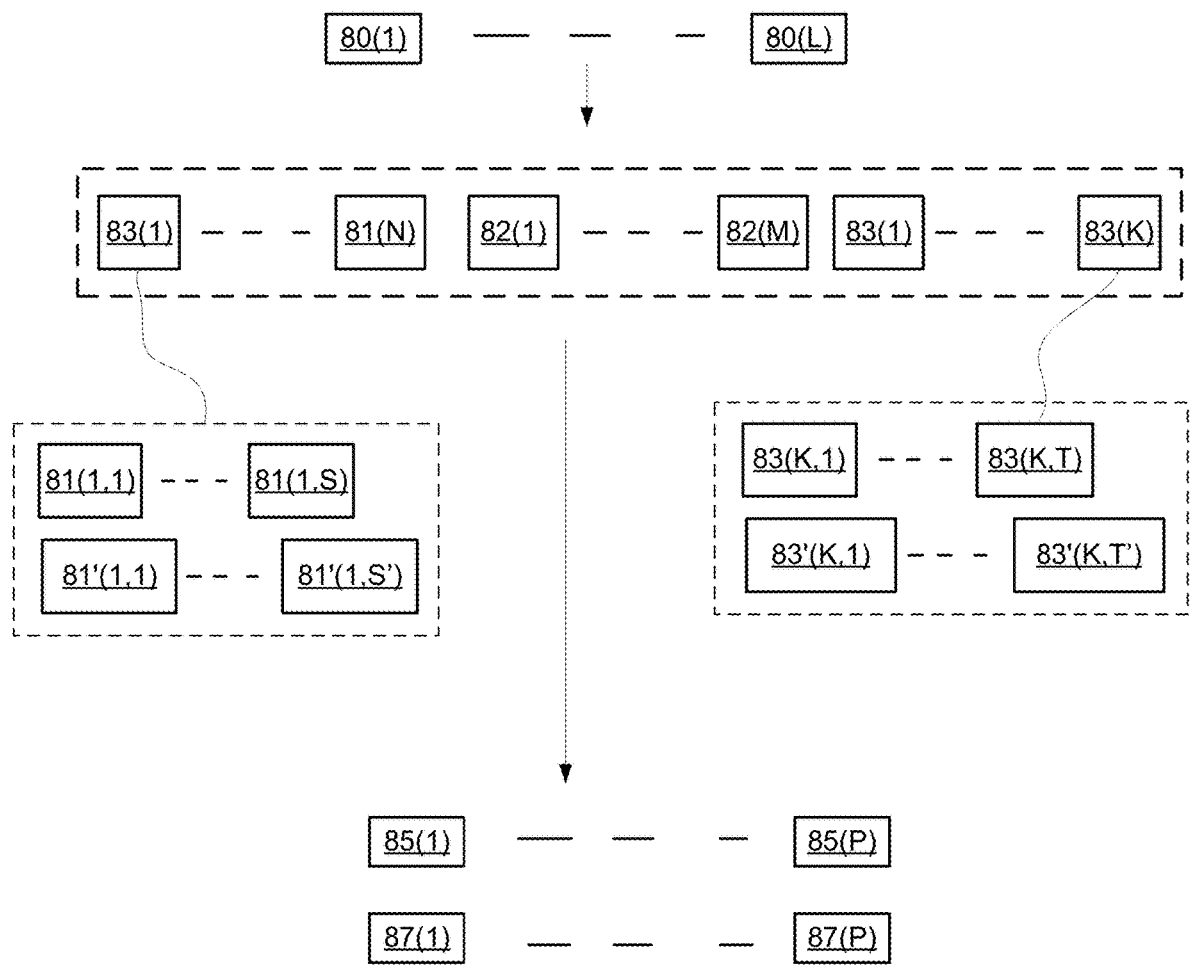
FIG. 3 is an example of various concept structures and signatures.

Assuming that there are multiple (for example P) relevant concept structures (denoted 85(1)-85(P) in FIG. 3) that are associated with up to P filming parameters 87(1)-87(P)—then the next filming parameters may be determined by applying any decision process on the up to P filming parameters. For example—majority voting, any selection of the selected filming parameters, and the like.

The current set of images (of step 110) may include an image in which a certain object covers a certain area of certain size of the image. Step 140 may include estimating next filming parameters that once obtained will result in an acquisition of a next image in which the certain object covers an area of the certain size.

Step 140 may include estimating the next filming parameters based on trial and error. This may involve using shorter duration iterations of steps 110, 120, 130 and 140—to compensate for error more quickly. The shorter duration are shorted that the duration of iterations executed after successfully finding desired filming parameters—for example after completing the trial and error.

Step 140 may be based on a mapping between an appearance of objects within a current image and filming parameters that were applied to obtain the appearance of the objects within the current image. The mapping may be generated by the machine learning process or in any other manner. For example—assuming that a face of an adult appears in an image then the mapping may indicate the distance to the camera based on the number of pixels of the face within the image. Yet for example—the angle of view of the camera may be deducted from the appearance of facial anchors such as a nose within the image.

Step 140 may include determining (for example according to the type of the event) items and/or event segments and/or object that should be searched in an event—event when they may not appear in the event—for example weddings may include many stages—but not all stagers appear in each wedding. The method may search for all stages. Yet for another example—some event segments may require to image the groom and bride and maybe the close family—while other event segments (such as dancing)—may require to film other people—but may also prioritize filming the bride and groom and the close family dancing.

Step 140 may be also based on filming parameters applied during an acquisition of images stored in one or more data structures associated with a user that is related to the event. The one or more data structures are social network data structures.

Step 140 may be responsive to additional information provided from an entity such as a human entity or any other information source—the additional information may include, for example, a definition of the type of event, any information that defines the event, any information that may related to any object captured in the current set of images—type of object, name of person that was captured in the current set of images, role of person (groom bride, professional, child), information regarding a relevancy of one or more captured object, the purpose of the filming (selling an object, distribution information via media network), and the like.

For example—the method may facilitate manually defining the category of the event while filming (and autonomously learning the features during training (as if you want to take a marketing video of the apartment—it needs to know that this is your goal).

For example—the method may facilitate tagging person of interest faces—so the method will concentrate on him while filming (e.g. you go to a carnival with many people—it knows to give the owner special attention).

The next set of images may become the current set of images and step 140 may be followed by step 110.

The repetitions of steps 110, 120, 130, 140 may be executed throughout the event.

The current set of images and each of the at least one next sets of images form a scene.

Method 100 may also include searching for one or more event segments of interest—and generating a shortened video of the event—that will include the one or more event segments of interest—while not including at least one event segments of lower or non-interest. The segmentation of the event and the detections of event segments of interest may be done in any manner—for example by analyzing (or training a network) based on videos of events of the same type.

Figure 2:
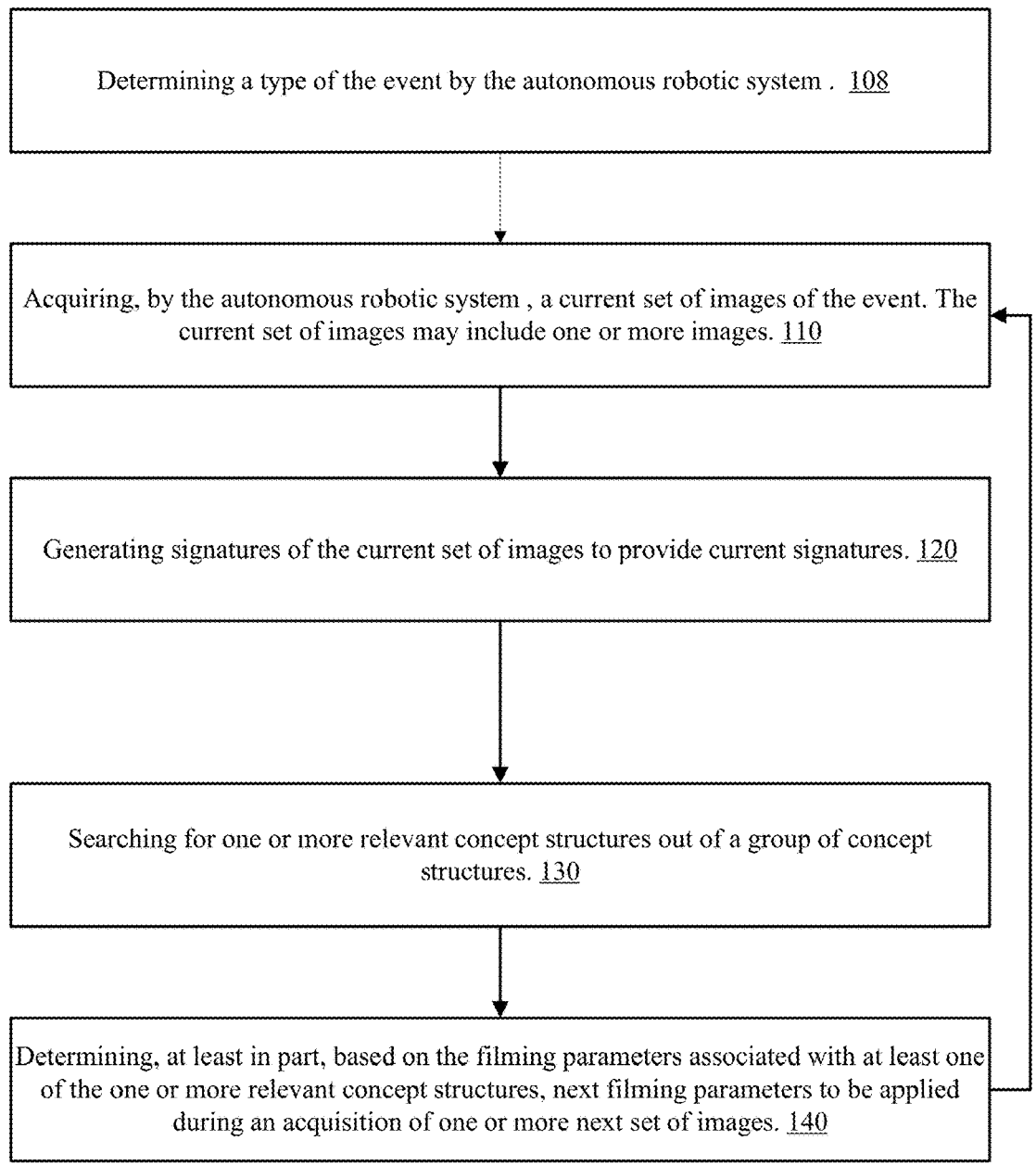
FIG. 2 is an example of a method.

FIG. 2 illustrates method 102 for filming an event by an autonomous robotic system.

Method 102 may include step 108 of determining a type of the event by the autonomous robotic system.

Step 108 may include acquiring initial images of the event and searching for an indicator about the type of the event. The indicator may be a unique object (such as a bride's dress, a wedding altar), a unique location (for example—a wedding venue), and the like.

Step 108 may be followed by step 110 of acquiring, by the autonomous robotic system, a current set of images of the event.

Step 110 may be followed by step 120 of generating signatures of the current set of images to provide current signatures.

Step 120 may be followed by step 130 of searching for one or more relevant concept structures out of a group of concept structures.

The group of concepts may be related to the type of the event. This may increase the efficiency of the search—as it may reduce the number of concept structures.

Step 130 may be followed by step 140 of determining, at least in part, based on the filming parameters associated with at least one of the one or more relevant concept structures, next filming parameters to be applied during an acquisition of one or more next set of images.

The determining may be based on the type of the event.

Figure 4:
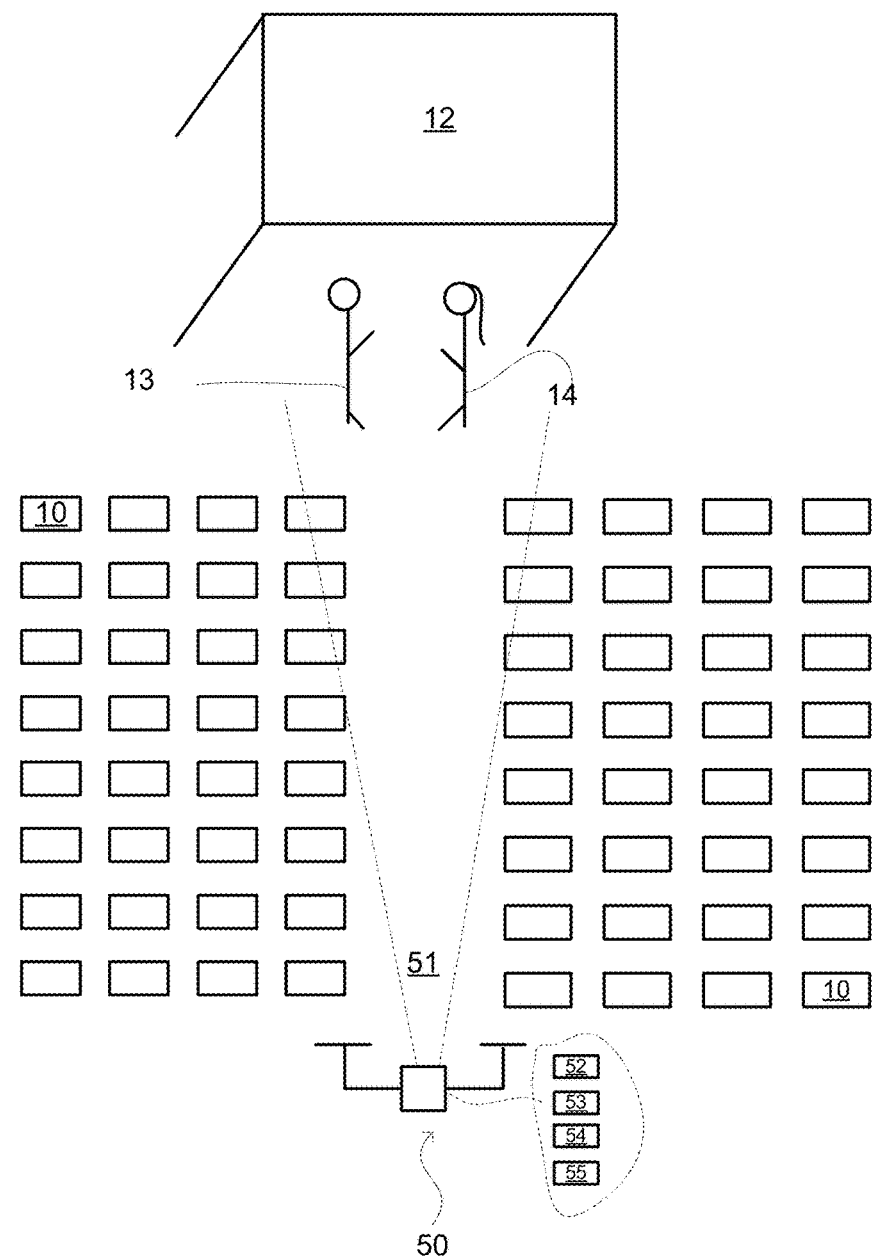
FIG. 4 illustrates a wedding scenario.
Figure 4:
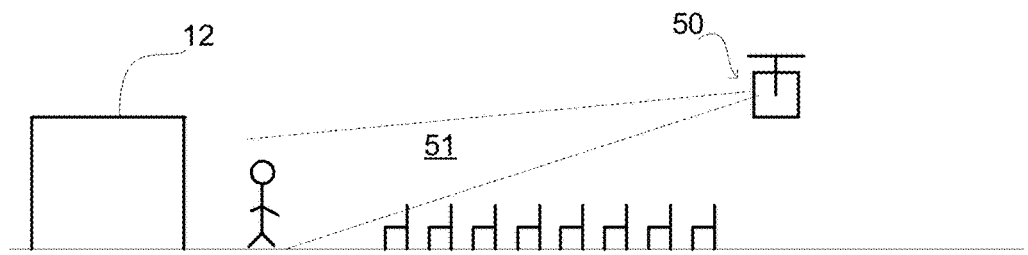

FIG. 4 illustrates a drone 50 (including a camera 52, memory unit 53, processor 54, and power source 55 such as a battery of a fuel tank) that acquires a video of a wedding—especially the exchange of vows between bride 14 and groom 13, standing near the altar 12 that is preceded by an array of chairs 10. In this figure the field of view 51 of the camera of the drone is relatively narrow—to include mostly the bride and the groom. It should be noted that the altar 12 may be identified and used to indicate that the event is a wedding.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for filming an event by an autonomous robotic system, the method comprises:
    (a) acquiring, by the autonomous robotic system, a current set of images of a current stage of the event; wherein the event is a structured event that comprises a predefined sequence of stages; wherein consecutive stages of the sequence of stages differ from each other by one or more filming parameters; wherein groups of images acquired during a stage differ from each other;
    (b) generating signatures of the current set of images to provide current signatures;
    (c) searching for one or more relevant concept structures that are associated with the current stage of the event; the one or more relevant concept structures are selected out of a group of concept structures that are associated with different stages of the sequence of stages; wherein each relevant concept structure comprises at least one signature that matches at least one of the current signatures; wherein each concept structure is associated with filming parameters;
    (d) determining, at least in part, based on the filming parameters associated with at least one of the one or more relevant concept structures, next filming parameters to be used in a next stage of the event, the current state of the event and the next stage of the event belong to the sequence of events; and
    (e) acquiring, by the autonomous robotic system, a next set of images, using the next filming parameters;
    wherein the method further comprises searching, during the next stage, one or more objects that identify the next stage when failing to find one or more objects that identify the current state during the current stage.

2. The method according to claim 1 wherein the one or more relevant concept structures that are associated with the current stage of the event comprises signatures of objects that identify the current stage of the event.

3. The method according to claim 1 wherein the each concept structure comprises explicit information regarding the filming parameters.

4. The method according to claim 1 wherein the each concept structure does not include explicit information regarding the filming parameters.

5. The method according to claim 1, wherein the filming parameters comprise at least one out of distance and angle of filming.

6. The method according to claim 1, wherein the filming parameters comprise one or more objects of interest.

7. The method according to claim 1, wherein the current set of images comprises an image in which a certain object covers a certain area of certain size of the image, wherein the determining comprises estimating next filming parameters that once obtained will result in an acquisition of a next image in which the certain object covers an area of the certain size.

8. The method according to claim 1, wherein the determining comprises estimating the next filming parameters based on trial and error.

9. The method according to claim 1, wherein the determining comprises estimating the next filming parameters based on a mapping between an appearance of objects within a current image and filming parameters that were applied to obtain the appearance of the objects within the current image.

10. The method according to claim 1 wherein the event is a wedding and the stages comprise exchange of vows, first dance, slicing a cake and a dancing party.

11. The method according to claim 1 wherein the group of concept structures are built by a machine learning process that was applied on multiple videos.

12. The method according to claim 11 wherein the multiple videos comprise videos obtained by a person related to the event.

13. The method according to claim 1, wherein the determining is also based on filming parameters applied during an acquisition of images stored in one or more data structures associated with a user that is related to the event.

14. The method according to claim 13, wherein the one or more data structures are social network data structures.

15. The method according to claim 1, wherein the determining comprises estimating the next filming parameters based on trial and error, wherein the trial and error comprises
using first iterations of steps (a), (b), (c) and (d)—till finding desired filming parameters; and performing second iterations of steps (a), (b), (c) and (d) after finding the desired filming parameters; wherein each second iteration has a longer duration than any first iteration.

16. The method according to claim 1 comprising determining one or more event segments of interest; and generating a shortened video of the event, the shortened video comprises one or more event segments of interest and does not comprise at least one event segment that differs from the one or more event segments of interest.

17. The method according to claim 1, wherein the one or more relevant concept structures are a plurality of relevant concept structures that are associated with a plurality of corresponding filming parameters, wherein the method comprises selecting some of the plurality of corresponding filming parameters.

18. The method according to claim 17, wherein the selecting comprises majority voting by selecting one or more filming parameters associated with more than one half of the plurality of relevant concept structures.

19. A non-transitory computer readable medium for filming an event by an autonomous robotic system, the non-transitory computer readable medium stores instructions for:
(a) acquiring, by the autonomous robotic system, a current set of images of a current stage of the event; wherein the event is a structured event that comprises a predefined sequence of stages; wherein consecutive stages of the sequence of stages differ from each other by one or more filming parameters; wherein groups of images acquired during a stage differ from each other;
(b) generating signatures of the current set of images to provide current signatures;
(c) searching for one or more relevant concept structures that are associated with the current stage of the event; the one or more relevant concept structures are selected out of a group of concept structures that are associated with different stages of the sequence of stages; wherein each relevant concept structure comprises at least one signature that matches at least one of the current signatures; wherein each concept structure is associated with filming parameters;
(d) determining, at least in part, based on the filming parameters associated with at least one of the one or more relevant concept structures, next filming parameters to be used in a next stage of the event, the current state of the event and the next stage of the event belong to the sequence of events;
(e) acquiring, by the autonomous robotic system, a next set of images, using the next filming parameters; and
wherein the non-transitory computer readable medium further stores instructions for searching, during the next stage, one or more objects that identify the next stage when failing to find one or more objects that identify the current state during the current stage.

* * * * *